United States Patent
Lee

(10) Patent No.: US 9,154,758 B2
(45) Date of Patent: Oct. 6, 2015

(54) DIGITAL SIGNAL PROCESSOR AND DIGITAL IMAGE PROCESSING APPARATUS ADOPTING THE SAME WITH CONCURRENT LIVE VIEW FRAME AND PICTURE IMAGE PROCESSING

(75) Inventor: Myung-hun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1104 days.

(21) Appl. No.: 12/074,317

(22) Filed: Mar. 3, 2008

(65) Prior Publication Data

US 2009/0040339 A1 Feb. 12, 2009

(30) Foreign Application Priority Data

Aug. 10, 2007 (KR) ........................ 10-2007-0080584

(51) Int. Cl.
*H04N 5/232* (2006.01)
*H04N 9/67* (2006.01)

(52) U.S. Cl.
CPC ............. *H04N 9/67* (2013.01); *H04N 5/23212* (2013.01); *H04N 5/23229* (2013.01)

(58) Field of Classification Search
CPC   H04N 3/155; H04N 5/23229; H04N 5/23293
USPC ........ 348/222.1, 234, 207.99, 333.01, 333.11
See application file for complete search history.

(56) References Cited

U.S. PATENT DOCUMENTS 6,963,374 B2 * 11/2005 Nakamura et al. ....... 348/333.11
7,796,160 B2 * 9/2010 Ueda et al. ................. 348/211.4
2001/0019362 A1 * 9/2001 Nakamura et al. ............ 348/222
2003/0038956 A1 2/2003 Aotsuka
2003/0156212 A1 * 8/2003 Kingetsu et al. ......... 348/333.12
2006/0103737 A1 5/2006 Okisu et al.

FOREIGN PATENT DOCUMENTS

| EP | 1 045 594 A2 | 10/2000 |
|---|---|---|
| JP | 2003-085690 A | 3/2003 |
| JP | 2006-058794 A | 3/2006 |
| JP | 2006-238106 A | 9/2006 |

OTHER PUBLICATIONS

Office Action established for CN 200810091585.7 (May 27, 2011).
Office Action established for CN 200810091585.7 (Apr. 11, 2012).
Examination Report established for GB 0804553.6 (Sep. 20, 2011).
Examination Report established for GB 0804553.6 (Mar. 19, 2012).
Office Action established for CN 200810091585.7 (Mar. 20, 2013).
Office Action established for CN 200810091585.7 (Oct. 22, 2012).
Office Action established for KR 10-2007-0080584 (Aug. 27, 2013).
Notice of Allowance issued for KR 10-2007-0080584 (Oct. 29, 2013).

* cited by examiner

*Primary Examiner* — Nicholas Giles
(74) *Attorney, Agent, or Firm* — Drinker Biddle & Reath LLP

(57) ABSTRACT

A digital signal processor and a digital image processing apparatus adopting the same. The digital signal processor comprises a data converter, which converts digital image data in red, green, and blue form to digital image data in luminance and chrominance form, such that when photograph-image data is captured by photographing, the data converter processes the photograph-image data during each period of time from the time when processing of one frame data of live-view is completed to the time when processing of next frame data begins.

21 Claims, 6 Drawing Sheets

DIGITAL SIGNAL PROCESSOR AND DIGITAL IMAGE PROCESSING APPARATUS ADOPTING THE SAME WITH CONCURRENT LIVE VIEW FRAME AND PICTURE IMAGE PROCESSING

CROSS-REFERENCE TO RELATED PATENT APPLICATION

This application claims the benefit of Korean Patent Application No. 10-2007-0080584, filed on Aug. 10, 2007, in the Korean Intellectual Property Office, the disclosure of which is incorporated herein in its entirety by reference.

BACKGROUND OF THE INVENTION

1. Field of the Invention

The present invention relates to a digital signal processor, and a digital image processing apparatus adopting the same, and more particularly, to a digital signal processor, which includes a data converter for converting digital image data in red, green, and blue form into digital image data in luminance and chrominance form, and a digital image processing apparatus adopting the digital signal processor.

2. Description of the Related Art

According to a live-view operation of a conventional digital image processing apparatus, a live-view conversion period, a live-view reduction period, and a live-view display period are repeated in a digital signal processor of the apparatus. The live-view conversion period, the live-view reduction period, and the live-view display period are set up to each have a duration of, for example, approximately 33 ms.

In the live-view conversion period, the data converter converts frame data in red, green, and blue form to frame data in luminance and chrominance form. In the live-view reduction period, resolution of the frame data in luminance and chrominance form is decreased. In the live-view display period, the frame data with decreased resolution is inputted to a display device.

When a photographing signal is generated while processing the frame data of live-view as described above, processing of the frame data of live-view is stopped and photograph-image data in red, green, and blue form is captured. A time for capturing the photograph-image data is long, for example, approximately 500 ms, because the frame data of live-view has a resolution suitable for display, and the resolution of the photograph-image data is relatively high.

The captured photograph-image data is converted to digital image data in luminance and chrominance form by the data converter. A time for converting the photograph-image data is also long, for example, approximately 200 ms.

In the live-view operation, a live-view conversion period of N+2th frame data, a live-view reduction period of N+1th frame data, and a live-view display period of N frame data are overlapped and repeated, with N being a natural number. In other words, in the live-view operation, a single data converter in the digital signal processor repeatedly operates with a cycle of, for example, approximately 33 ms.

Accordingly, in the conventional digital image processing apparatus, the live-view operation cannot be performed approximately for 700 ms, which is the sum total of 500 ms of time for capturing the photograph-image data and 200 ms of time for converting the photograph-image data. Thus, a next image can only be photographed approximately 700 ms after photographing an image. That is, the maximum speed of continuous photographing is approximately 1.43 images per second.

SUMMARY OF THE INVENTION

The present invention provides a digital signal processor, which has an increased maximum speed of continuous photographing, and a digital image processing apparatus employing the digital signal processor.

An embodiment of the present invention provides a digital signal processor comprising a data converter, which converts digital image data in red, green, and blue form to digital image data in luminance and chrominance form, such that when photograph-image data is captured by photographing, the data converter processes the photograph-image data during each period of time from the time when processing of one frame data of live-view is completed to the time when processing of next frame data begins. The digital signal processor can be employed in a digital image processing apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
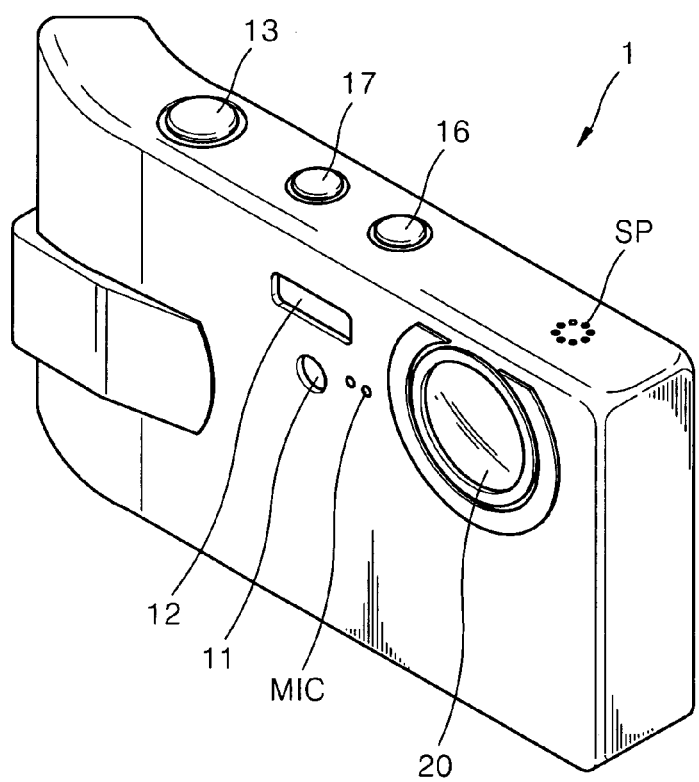
FIG. 1 is a perspective view illustrating front and top external forms of a digital camera as an example of a digital image processing apparatus according to an embodiment of the present invention.

Hereinafter, exemplary embodiments of the present invention will be described more fully with reference to the accompanying drawings. Like reference numerals in the drawings denote like elements.

FIG. 1 is a perspective view illustrating front and top external forms of a digital camera 1 as an example of a digital image processing apparatus according to an embodiment of the present invention. Referring to FIG. 1, the front and the top of the digital camera 1 include a self-timer lamp 11, a flash 12, a shutter release button 13, an advance shake reduction (ASR) mode button 16, a power button 17, a lens 20, a microphone MIC, and a speaker SP.

In a self-timer mode, the self-timer lamp 11 operates for a setting time from when the shutter release button 13 is pressed to when an image is captured. Also, the self-timer lamp 11 generates a sub-light based on the wishes of a user. The ASR mode button 16 is used to compensate for hand shake or other movement. The ASR mode button 16 is also used as a lock button. For example, when the ASR mode button 16 is pressed for less than 1 second, a hand shake compensation function is performed, and when the ASR mode button 16 is pressed more than or for 1 second, a lock function in a reduction mode is performed.

The shutter release button 13 has a two-stage structure in this example. In other words, after the user manipulates a wide angle-zoom button $39_W$ and/or a telephoto-zoom button $39_T$, when the user presses the shutter release button 13 to a first stage, a first signal is generated, and when the user presses the shutter release button 13 to a second stage, a second signal is generated. In a static image photograph mode, when the first signal is generated, an automatic focusing is performed, and when the second signal is generated, a photograph-image data is captured and processed. Details of these operations will be described later with reference to FIGS. 5 through 7.

Figure 2:
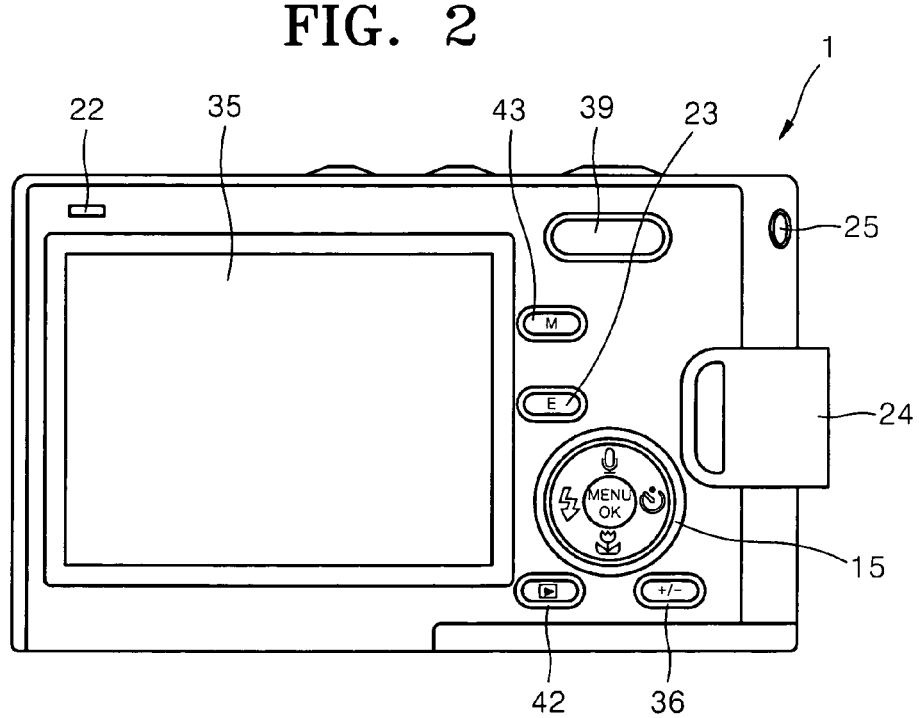
FIG. 2 is a rear view of a rear external form of the digital camera illustrated in FIG. 1.

FIG. 2 is a view of a rear external form of the digital camera 1 illustrated in FIG. 1. As shown, the rear of the digital camera 1 includes function buttons 15, a camera state lamp 22, a special effect button 23, a camera string hanger 24, an earphone connector 25, a display panel 35, a +/− button 36, zoom/9 partition/volume button 39, a play/print button 42, and a mode button 43.

The function buttons 15 are used to perform certain functions of the digital camera 1, used as buttons for moving an activation cursor in a menu screen of the display panel 35, and used to changing a file and recording medium of a play object in a play mode. The camera state lamp 22 is used to show various operation states of the digital camera 1. The special effect button 23 is used to set up special effects in an image that is to be photographed.

In this current embodiment, the display panel 35 employs a touch screen. The +/− button 36 is used to adjust shutter speed for a night view photograph, or the like. The zoom/9 partition/volume button 39 is used to perform a zooming operation in a photograph or play mode, display 9 photographs in one screen in a play mode, or adjust volume of an audio. The play/print button 42 is used to switch between a play mode and a preview mode, or directly print a photograph via a printer. The mode button 43 is used to select a portable media player (PMP) mode or various photograph modes.

Figure 3:
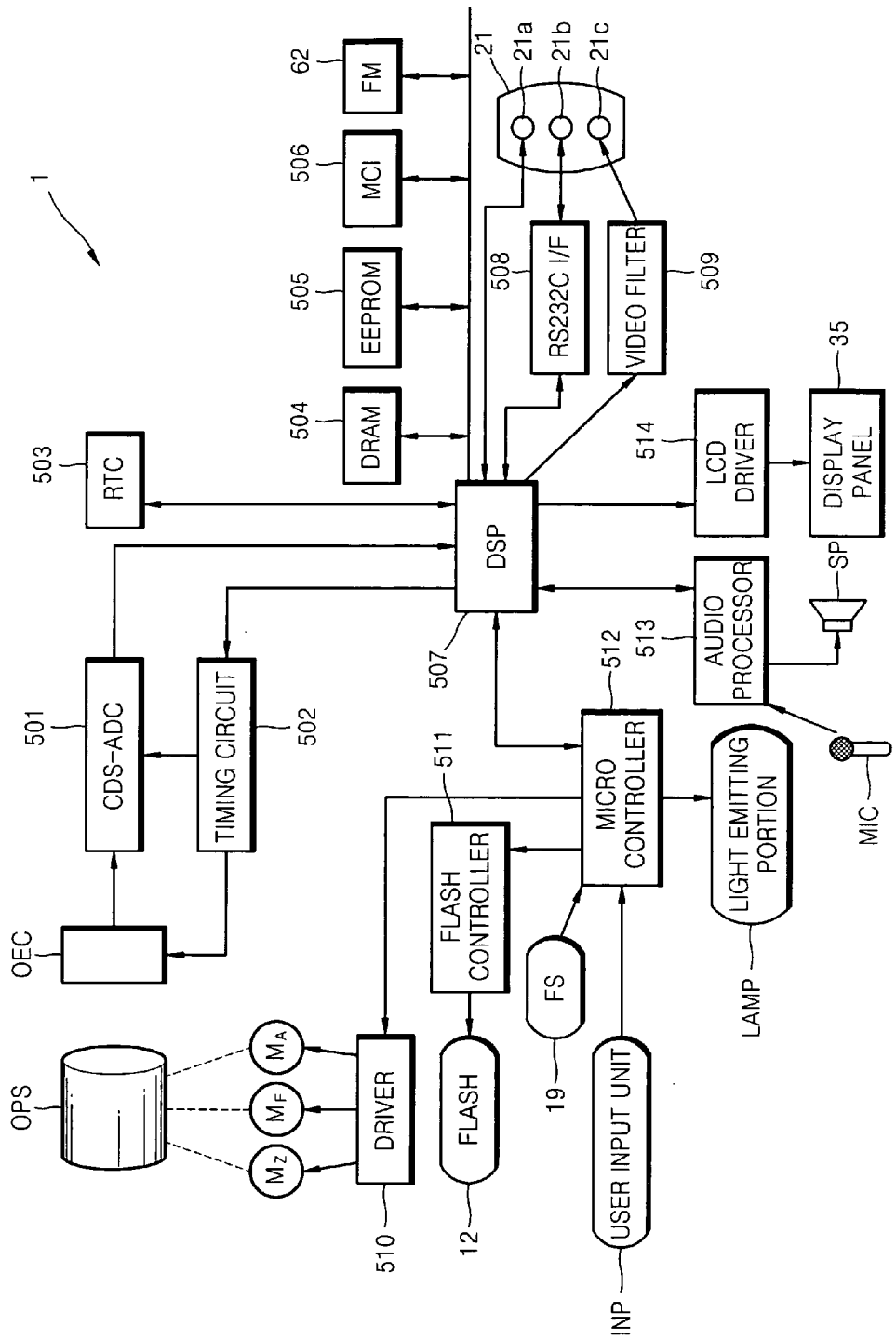
FIG. 3 is a diagram illustrating an overall configuration of the digital camera illustrated in FIG. 1.

FIG. 3 is a diagram illustrating an example of an overall configuration of the digital camera 1 illustrated in FIG. 1. The configuration and operations of the digital camera 1 of FIG. 1 will now be described with reference to FIGS. 1 through 3.

An optical system OPS, which includes a lens (not shown) and a filter (not shown), optically processes light from a subject. The lens of the optical system OPS includes a zoom lens (not shown), a focus lens (not shown), and a compensation lens (not shown). When the user presses the zoom/9 partition/volume button 39, included in a user input unit (INP), in a preview mode or a moving picture photograph mode, a corresponding signal is input to a microcontroller 512. Accordingly, the zoom lens moves by driving a zoom motor $M_Z$ as the microcontroller 512 controls a driver 510.

Figure 4:
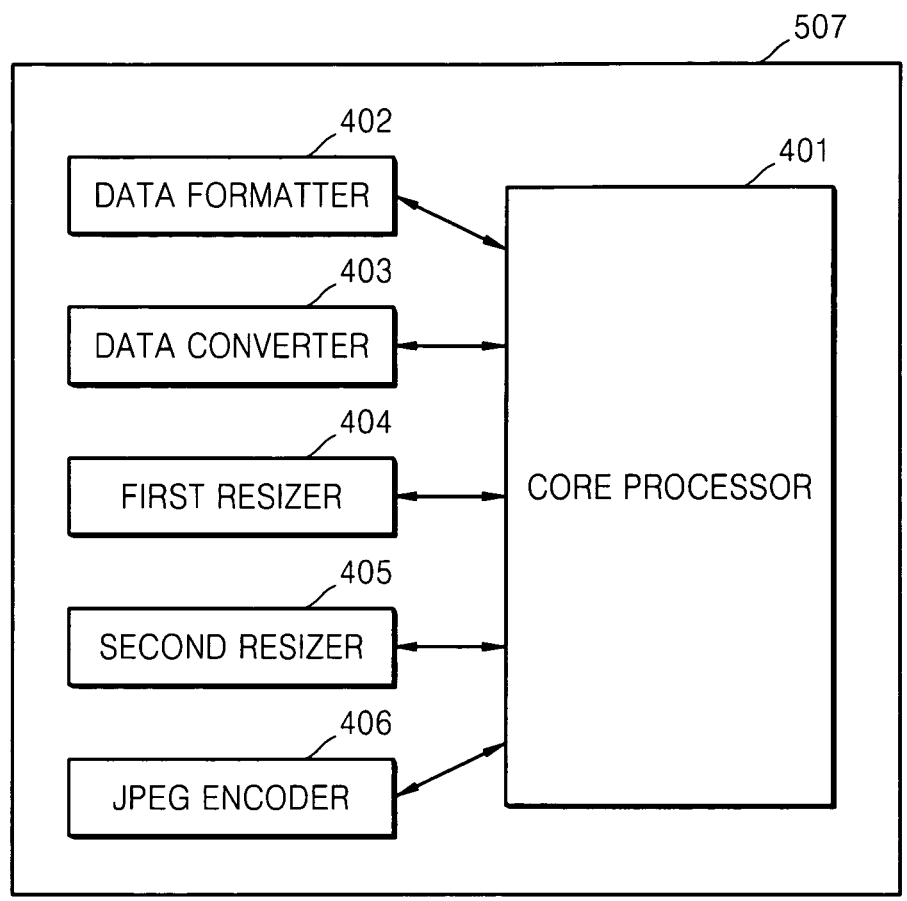
FIG. 4 is a block diagram illustrating an example of an internal configuration of a digital signal processor illustrated in FIG. 3.

In an automatic focusing mode, a core processor 401 illustrated in FIG. 4, which is embedded in a digital signal processor 507, controls the driver 510 through the microcontroller 512, and thus a focus motor $M_F$ is driven. Accordingly, the focus lens moves, and during this process, a location of the focus lens, in which existence of high frequency components of an image signal is the most, is determined, for example, the number of operation steps of the focus $M_F$ is determined. A reference symbol MA denotes a motor for driving an aperture (not shown).

A photoelectric converter OEC of a charge coupled device (CCD) or a complementary metal-oxide semiconductor (CMOS) converts the light from the optical system OPS to an electric analog image signal. Here, the digital signal processor 507, as a main controller, controls a timing circuit 502 so as to control operations of the photoelectric converter OEC and an analog-digital converter. A correlation double sampler and analog-to-digital converter (CDS-ADC) 501, as the analog-digital converter, processes the analog image signal from the photoelectric converter OEC by removing high frequency noise and adjusting the amplitude, and then converts the analog image signal to digital image data. The digital image data is input to the digital signal processor 507.

A real time clock (RTC) 503 provides time information to the digital signal processor 507. The digital signal processor 507 processes a digital signal from the CDS-ADC 501 so as to generate digital image data, which is divided into a luminance signal and a chrominance signal.

A light emitting portion LAMP, which is driven by the microprocessor 512 according to control signals from the digital signal processor 507, includes the self-timer lamp 11 and the camera state lamp 22. The user input device INP includes the shutter release button 13, the function buttons 15, the ASR mode button 16, the power button 17, the special effect button 23, the +/− button 36, the zoom/9 partition/volume button 39, the play/printer button 42, and the mode button 43.

A dynamic random access memory (DRAM) 504 temporarily stores the digital image data from the digital signal processor 507. An electrically erasable and programmable read only memory (EEPROM) 505 stores algorithms required in operating the digital signal processor 507. A removable memory card of the user can be installed in a memory card interface (MCI) 506. A flash memory (FM) 62 stores setup data required in operating the digital signal processor 507. A plurality of removable memory cards may be installed in the memory card interface 506 as recording media.

A display device (514 and 35) displays an image according to the digital image data from the digital signal processor 507. In other words, the digital image data from the digital signal processor 507 is inputted to an LCD driver 514, and accordingly, an image is displayed on the display panel 35. In this example, the display panel 35 is a color LCD panel.

In an interface 21, the digital image data from the digital signal processor 507 can be transmitted by serial communication through a universal serial bus (USB) connector 21a, or through an RS232C interface 508 and an RS232C interface connector 21b, or through any other suitable connection. Alternatively, the digital image data can be transmitted as a video signal through a video filter 509 and a video output unit 21c.

An audio processor 513 outputs a voice signal from the microphone MIC to the digital signal processor 507 or the speaker SP, and outputs an audio signal from the digital signal processor 507 to the speaker SP.

The microcontroller 512 drives a flash 12 by controlling operations of a flash controller 511 according to a signal from a flash light amount sensor 19.

FIG. 4 is a block diagram illustrating an example of an internal configuration of the digital signal processor 507 illustrated in FIG. 3. Referring to FIGS. 3 and 4, the digital signal processor 507 of FIG. 3 includes a data formatter 402, a data converter 403, a plurality of resizers 404 and 405, a joint photographic experts group (JPEG) encoder 406, and a core processor 401. The data formatter 402, which is controlled by the core processor 401, arranges the digital image data from the CDS-ADC 501, as an analog-digital converter, to be suitable to a storage form of the DRAM 504. The data converter 403, which is controlled by the core processor 401, converts the digital data in red, green, and blue form to digital data in luminance and chrominance form.

The plurality of resizers 404 and 405, which are controlled by the core processor 401, reduces resolution of the digital image data from the CDS-ADC 501. In detail, the plurality of resizers 404 and 405 reduce resolution of frame data of live-view so that the resolution is suitable for the display panel 35. Also, when photograph-image data is captured, the plurality of resizers 404 and 405 generates image data and index image data having resolutions suitable for the display panel 35. The image data having resolution suitable for the display panel 35 is generally called screen-nail image data. The index image data, having the resolution lower than the resolution suitable to the display panel 35, is generally called thumb-nail image data.

The JPEG encoder 406, which is controlled by the core processor 401, compresses the digital image data from the CDS-ADC 501. The core processor 401 performs overall control and data process.

Figure 5:
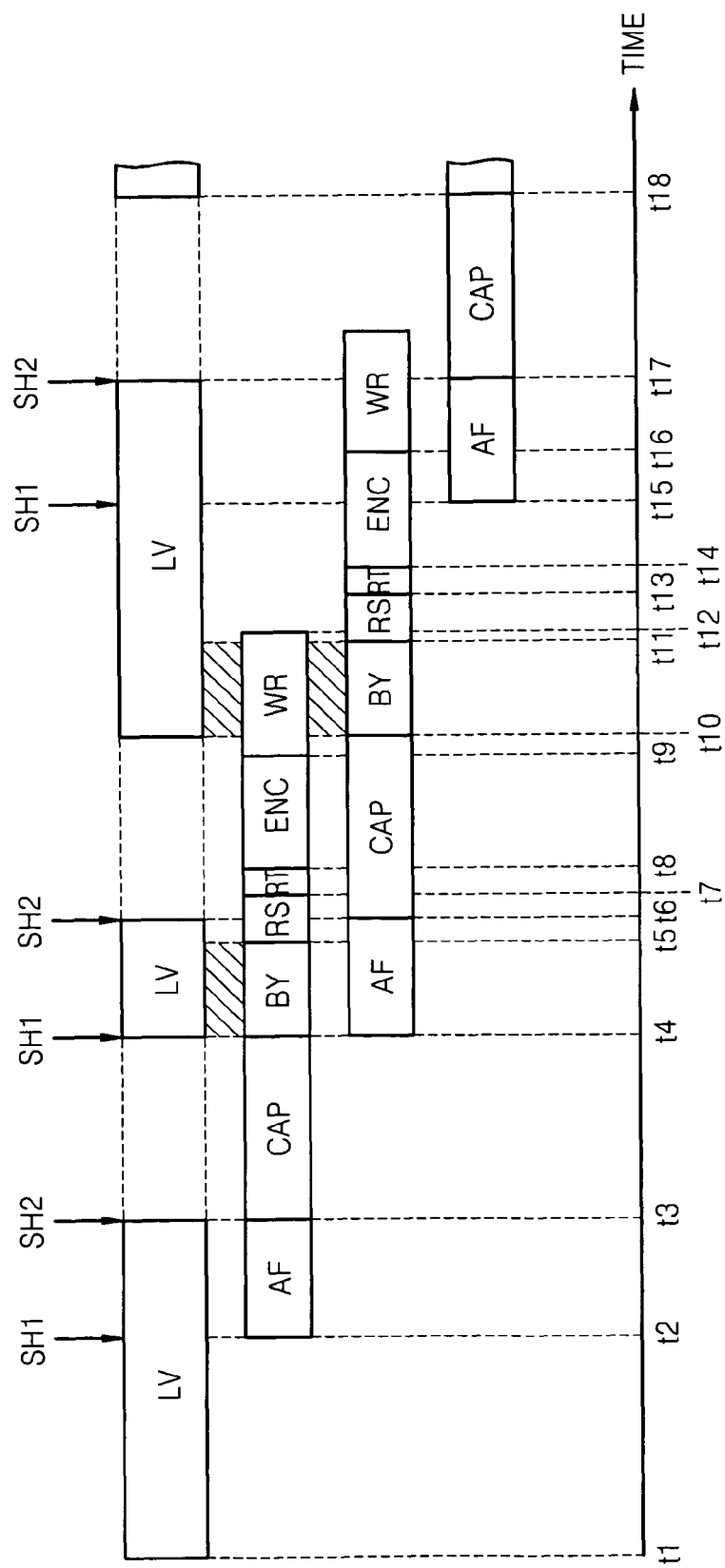
FIG. 5 is a timing diagram illustrating an example of data processing operations of the digital signal processor illustrated in FIG. 3.

FIG. 5 is an example of a timing diagram illustrating data processing operations of the digital signal processor 507 illustrated in FIG. 3. In FIG. 5, SH1 denotes a first signal from the shutter release button 13, SH2 denotes a second signal from the shutter release button 13, LV denotes a live-view processing time, AF denotes an automatic focusing time, CAP denotes a photograph-image capturing time, and BY denotes a photograph-image converting time. RS denotes a photograph-image reducing time in which image data having resolution suitable for the display panel 35 is generated. RT denotes a photograph-image reducing time is which index image data is generated. Also, ENC denotes a photograph-image compressing time, and WR denotes a photograph-image recording time.

The data processing operations of the digital signal processor 507 of FIG. 3 will now be described with reference to FIGS. 3 through 5.

As described above, the shutter release button 13 of FIG. 1 has a two-stage structure. In other words, when a user presses the shutter release button 13 to a first stage, the first signal SH1 is generated from the shutter release button 13, and when the user presses the shutter release button 13 to a second stage, the second signal SH2 is generated from the shutter release button 13.

During t1 to t2 (LV), the digital signal processor 507 processes continuous frame data of live-view from the CDS-ADC 501. When the first signal SH1 is generated from the shutter release button 13 at t2, the digital signal processor 507 processes the continuous frame data of live-view (LV), while performing the automatic focusing according to control signals of the core processor 401 during t2 to t3 (AF), that is, from t2 to t3, in which the second signal SH2 is generated. When the second signal SH2 is generated from the shutter release button 13 at t3, the data processing operation of live-view stops (i.e., LV stops) during t3 to t4 (CAP), which is approximately 500 ms from t3, and first photograph-image data is captured by the core processor 401.

During t4 to t5 (BY), which in this example is approximately 200 ms, wherein t4 is a time in which capturing the first photograph-image data is completed, the digital signal processor 507 continues the data processing operation of live-view (i.e., LV continues), while the data converter 403 converts the captured first photograph-image data to first photograph-image data in luminance and chrominance form using the time remaining after the data converter 403 has processed the frame data of live-view. For example, an operation cycle of the data converter 403 is set to be 33 ms, but 10 ms is enough for the data converter to process one frame of data of live-view. Accordingly, the data converter 403 converts the photograph-image data during the remaining time of 23 ms. In other words, during BY, the converting of the photograph-image data and processing of the frame data of live-view are performed together.

Accordingly, the data processing operation stops for CAP, which is approximately 500 ms, and is processed during the remaining time. Thus, a next image can be photographed in this example after approximately 500 ms after photographing a current image. That is, the maximum speed of continuous photographing can be increased to approximately 2 images per second in this example.

As illustrated in FIG. 5, when the first signal SH1 is generated from the shutter release button at t4, an automatic focusing is performed according to control of the core processor 507 during t4 to t6 (AF), where t6 is the time when the second signal SH2 is generated. From the time when BY stops to a time the automatic focusing is completed, i.e. during t5 to t6, the automatic focusing is performed, the data processing operation of live-view is performed, and resolution of the first photograph-image data is reduced (RS) by the first resizer 404 or the second resizer 405 to be suitable for the display panel 35. When the second signal SH2 is generated from the shutter release button 13 at t6, the data processing operation of live-view stops for t6 to t10, which is CAP of approximately 500 ms, and second photograph-image data is captured by the core processor 507.

When reduction image data (screen-nail image data) of the first photograph-image data is obtained during t6 to t7 (RS) by the first resizer 404 or the second resizer 405 reducing the resolution of the first photograph-image data to be suitable for the display panel 35, index image data (thumbnail image data) of the first photograph-image data is obtained by the first resizer 404 or the second resizer 405 during t7 to t8 (RT). Also, during t8 to t9, the first photograph-image data is compressed by the JPEG encoder 406. In addition, the core processor 401 stores the compressed first photograph-image data, the reduction image data (screen-nail image data) of the first photograph-image data, and the index image data (thumbnail image data) of the first photograph-image data in a recording medium, such as a memory card.

In this example, for approximately 200 ms after t10, which is a time during which capturing of the second photograph-image data is completed, that is, during t10 to t11 (BY), the digital signal processor 507 continues the data processing operation of live-view, while the data converter 403 converts the captured second photograph-image data to second photograph-image data in luminance and chrominance form using the time remaining after the data converter 403 has processed the frame data of live-view.

During t12 to t13 (RS), the data processing operation of live-view is performed while the first or second resizer 404 or 405 reduces resolution of the second photograph-image data to be suitable for the display panel 35.

During t13 to t14 (RT), the data processing operation of live-view is performed while the first or second resizer 404 or 405 generates the index image data.

During t14 to t15 (ENC), the data processing operation of live-view is performed while the JPEG encoder 406 compresses the second photograph-image data.

In addition, when the first signal SH1 is generated from the shutter release button 13 at t15 as illustrated in FIG. 5, the automatic focusing is performed according to control signals of the core processor 401 from t15 to a time the second signal SH2 is generated, for example, during t15 to t17. Accordingly, during t15 to t16, the automatic focusing is performed while the data processing operation of live-view is performed, and in addition, the second photograph-image data is compressed by the JPEG encoder 406.

During t16 to t17, the automatic focusing is performed while the data processing operation of live-view is performed, and in addition, the core processor 401 stores the compressed second photograph-image data, the reduction image data (screen-nail image data) of the second photograph-image data, and the index image data (thumbnail image data) of the second photograph-image data in a recording medium, such as a memory card. When the second signal SH2 is generated from the shutter release button at t17, the data processing operation of live-view stops for approximately 500 ms from t17, i.e. during t17 to t18 (CAP), and the core processor 507 captures the second photograph-image data.

Figure 6:
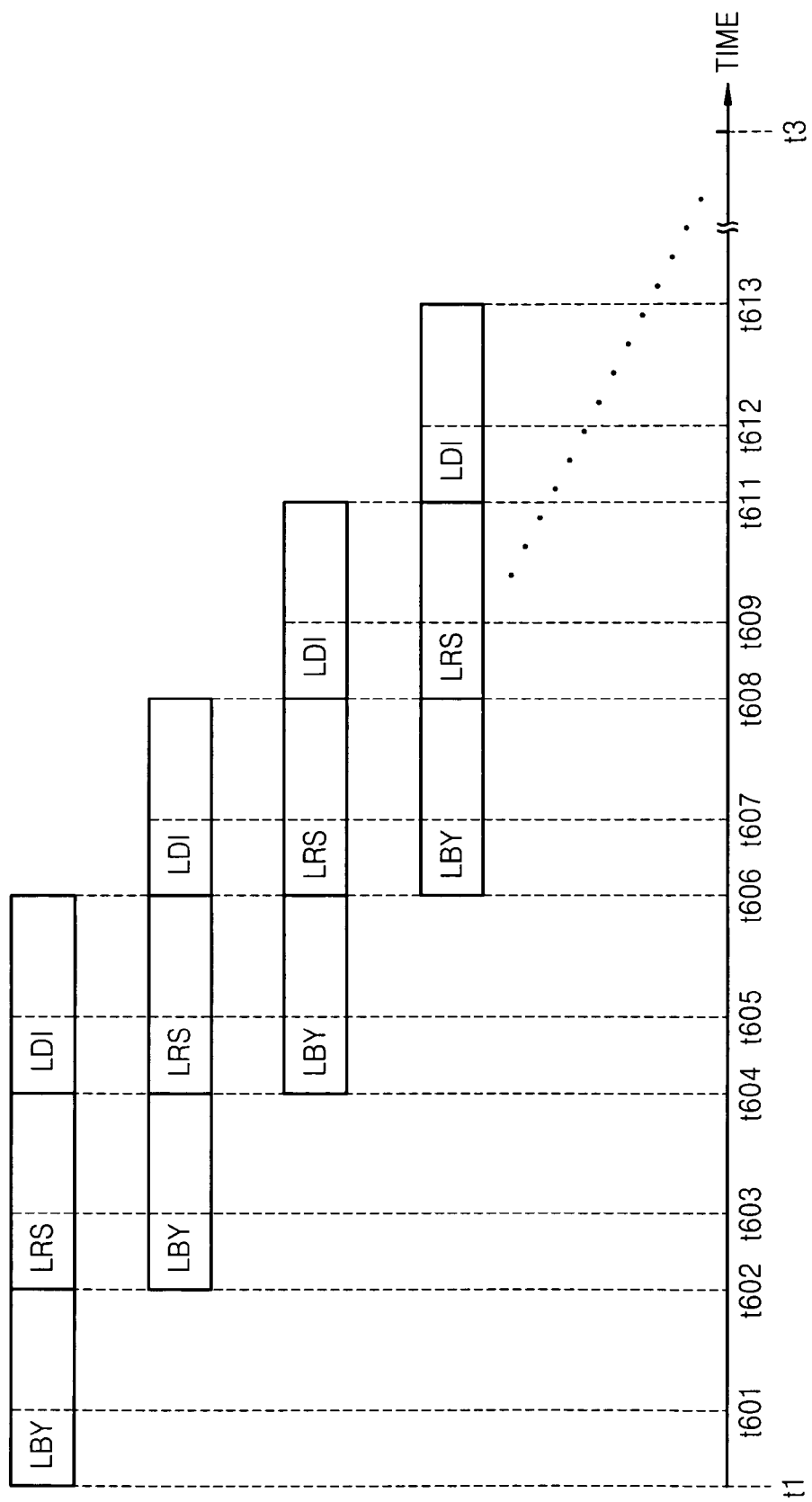
FIG. 6 is a timing diagram illustrating in detail an example of an operation of continuously processing frame data of live-view during t1 to t3 of FIG. 5.

FIG. 6 is a timing diagram illustrating in detail an example an operation of continuously processing frame data of live-view during t1 to t3 of FIG. 5. The operation of FIG. 6 is equally applied during t5 to t6 and during t11 to t17. That is, during t1 to t3, t5 to t6, and t11 to t17, the data processing operation of live-view is not performed with the operation of converting photograph-image data. In FIG. 6, LBY denotes a conversion period of live-view, LRS denotes a reduction period of live-view, and LDI denotes a display period of live-view.

Figure 7:
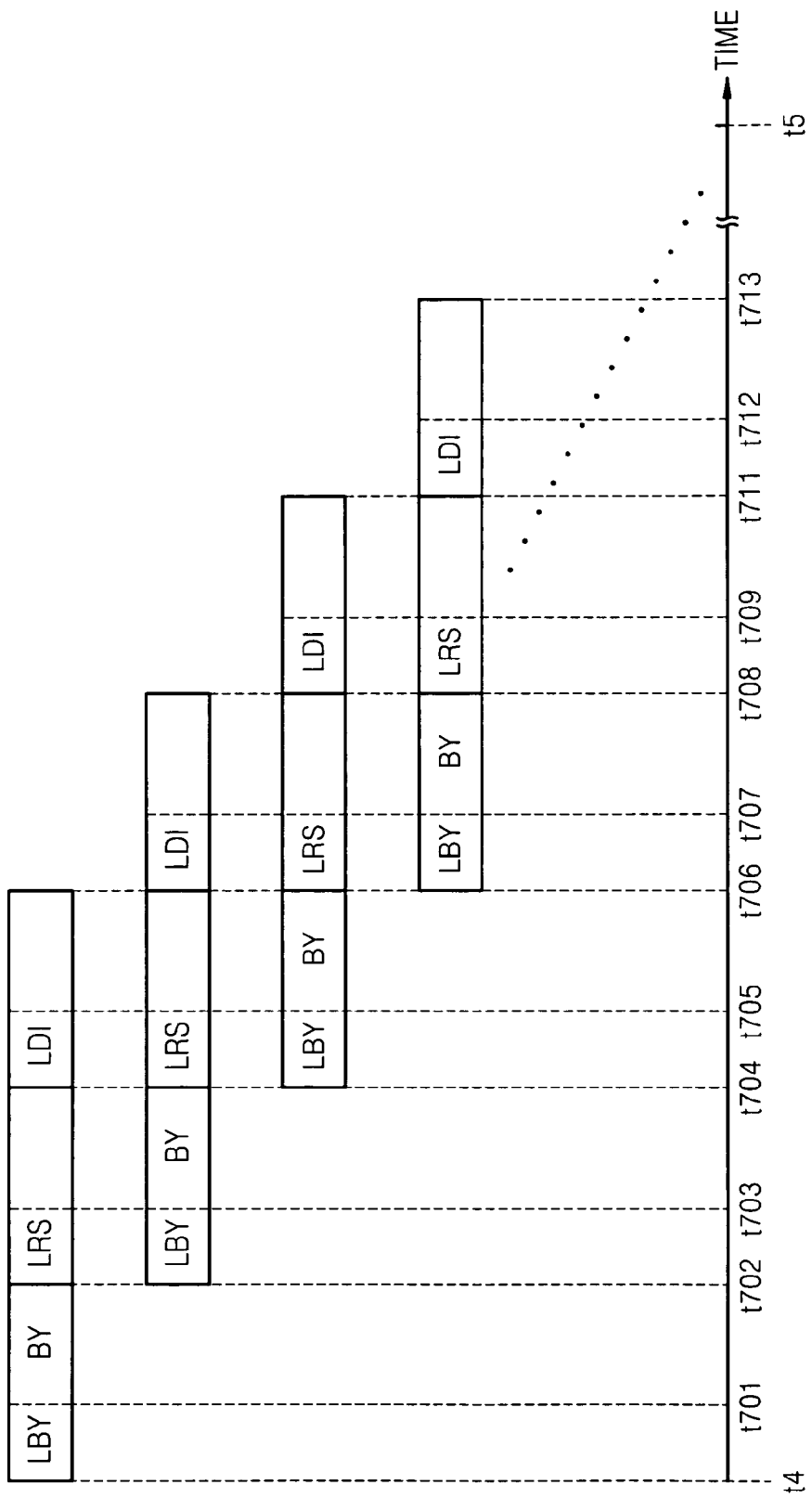
FIG. 7 is a timing diagram illustrating in detail an example of conversion of frame data of live-view during t4 to t5 of FIG. 5, and conversion of photograph-image data during remaining time.

FIG. 7 is a timing diagram illustrating in detail an example of conversion of frame data of live-view during t4 to t5 of FIG. 5, and conversion of photograph-image data during the remaining time. In other words, FIG. 7 shows in detail an operation of converting photograph-image data using the time remaining after converting frame data of live-view during t4 to t5 of FIG. 5, i.e. from the time when processing of one frame data of live-view is completed to the time when processing of next frame data begins. The operation of FIG. 7 is equally applied during t10 to t11. That is, during t4 to t5 and during t10 to t11, the data processing operation of live-view and the conversion operation of photograph-image data are performed together. In FIGS. 6 and 7, like reference symbols denote like elements.

Referring to FIGS. 4 through 7, regarding LV during t1 to t3, t4 to t6, and t10 to t17 excluding CAP during t3 to t4, t6 to t10, and t17 to t18, LBY, LRS, and LDI are simultaneously or substantially simultaneously performed. Also, LBY for N+2th frame data, LRS for N+1th frame data, and LDI for Nth frame data are simultaneously or substantially simultaneously performed, wherein N is a natural number.

During LBY, the data converter 403 converts frame data of live-view to frame data in luminance and chrominance form according to control signals of the core processor 401. Here, when photograph-image data is captured, the data converter 403 processes the photograph-image data using the time remaining (BY) after processing the frame data of live-view (LBY), that is, from the time when processing of one frame data of live-view is completed to the time when processing of next frame data begins (refer to FIG. 7).

During LRS, resolution of the frame data in luminance and chrominance form is reduced by the first or second resizers 404 or 405 according to control signals of the core processor 401. During LDI, the frame data having the reduced resolution is inputted to the LCD driver 514 by the core processor 401.

As described above, in the digital signal processor and the digital image processing apparatus employing the digital signal processor according to an embodiment of the present invention, the data converter built inside the digital signal processor processes the photograph-image data using the time remaining after the frame data of live-view has been processed. For example, the operation cycle of the data converter is set to be at or about 33 ms, but at or about 10 ms is enough for the data converter to process one frame of data of live-view. Accordingly, the data converter converts the photograph-image data during the remaining time, for example, at or about 23 ms. In other words, the photograph-image data is converted while the frame data is processed.

Accordingly, the data processing operation stops for the time for capturing photograph-image data of, in this example, approximately 500 ms or less, and is performed for the remaining time. Thus, in this example, approximately 500 ms or less after photographing an image, a next image can be photographed. That is, the maximum speed of continuous photographing can be increased to approximately 2 images per second in this example, that is, 2 images can be captured in one second or less.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital signal processor, comprising:
   a data converter, which converts digital image data in red, green, and blue form to digital image data in luminance and chrominance form; and
   a core processor, which controls the data converter when photograph-image data for a given image is captured by photographing, during a live-view converting time period in which a frame data in red, green, and blue form is converted to a frame data in luminance and chrominance form, to convert a Bart of the captured photograph image data using the time remaining of the live-view converting time period after converting a frame data of live-view,
   wherein the converting of the photograph image data and the processing of the frame data of live-view are performed together during the live-view converting time period.

2. A digital image processing apparatus comprising:
   a digital signal processor as claimed in claim 1.

3. The digital image processing apparatus of claim 2, further comprising:
   an optical system, which optically processes light of a subject;
   a photoelectric converter, which converts the light from the optical system to an electric analog image signal in red, green, and blue;
   an analog-to-digital converter, which converts the analog image signal from the photoelectric converter to digital image data, and inputs the digital image data to the digital signal processor;
   a display device, which displays an image according to the digital image data from the digital signal processor; and
   a random access memory (RAM), in which the digital image data from the digital signal processor is temporarily stored.

4. The digital image processing apparatus of claim 3, wherein the digital signal processor further comprises:
   a data formatter, which arranges the digital image data from the analog-to-digital converter according to a storage form of the RAM;

a plurality of resizers, which reduce resolution of the digital image data from the analog-digital converter; and an encoder, which compresses the digital image data from the analog-to-digital converter, wherein the core processor controls operations of at least the data converter and resizers.

5. The digital image processing apparatus of claim 4, wherein when the frame data of live-view is inputted to the digital signal processor from the analog-to-digital converter, the data converter converts the frame data to frame data in luminance and chrominance form according to control of the core processor during a live-view conversion period, the resizers decrease resolution of the frame data in luminance and chrominance form according to control of the core processor during a live-view reduction period, and the core processor inputs the frame data with decreased resolution to an input device during a live-view display period.

6. The digital image processing apparatus of claim 5, wherein N is defined as a first natural number, with N, N+1, and N+2 being defined as three sequential natural numbers and the live-view conversion period of N+2th frame data, the live-view reduction period of N+1th frame data, and the live-view display period of Nth frame data are substantially simultaneously performed.

7. The digital image processing apparatus of claim 6, further comprising a shutter release button having a two-stage structure, wherein a first signal and a second signal are generated from the shutter release button.

8. The digital image processing apparatus of claim 7, wherein when the first signal is generated, the digital signal processor performs an automatic focusing according to control signals of the core processor as the frame data of live-view is continuously processed in the live-view conversion period, the live-view reduction period, and the live-view display period.

9. The digital image processing apparatus of claim 8, wherein when the second signal is generated, processing of the frame data of live-view is stopped, the photograph-image data is captured by the core processor while processing of the frame data of live-view is stopped, the frame data of live-view continues to be processed when the capture of the photograph-image data is completed, the data converter converts the captured photograph-image data to photograph-image data in luminance and chrominance form during each period of time from the time when processing of one frame data of live-view is completed to the time when processing of next frame of live view data begins, the resizers reduce resolution of the converted photograph-image data while the frame data of live-view is being processed, the encoder compresses the converted photograph-image data while the frame data of live-view is being processed, and the core processor records the compressed photograph-image data and the photograph-image data with reduced resolution in a recording medium while the frame data of live-view is being processed.

10. The digital image processing apparatus as claimed in claim 2, wherein:

the data converter converts the digital image data and processes the photograph-image data to enable the digital image processing apparatus to photograph two photograph images within one second.

11. A digital image processing method comprising:

converting digital image data in red, green, and blue form to digital image data in luminance and chrominance form; and when photograph-image data for a given image is captured by photographing, during a live-view converting time period in which a frame data in red, green, and blue form is converted to a frame data in luminance and chrominance form, converting a part of the photograph-image data in a time remaining after converting the frame data of live-view, wherein the converting of the photograph image data and the processing of the frame data of live-view are performed together during the live-view converting time period.

12. The method of claim 11, further comprising:

operating a digital image processing apparatus to perform the converting and processing steps.

13. The method of claim 11, further comprising:

optically processing light of a subject;

converting the light to an electric analog image signal in red, green, and blue;

converting the analog image signal from a photoelectric converter to digital image data;

displaying an image according to the digital image data from a digital signal processor; and temporarily storing the digital image data from the digital signal processor in a random access memory (RAM).

14. The method of claim 13, further comprising:

arranging the digital image data according to a storage form of the RAM;

reducing resolution of the digital image data; and compressing the digital image data from an analog-to-digital converter.

15. The method of claim 14, wherein when the frame data of live-view is input:

converting the frame data to frame data in luminance and chrominance form during a live-view conversion period, decreasing resolution of the frame data in luminance and chrominance form during a live-view reduction period, and inputting the frame data with decreased resolution to an input device during a live-view display period.

16. The method of claim 15, wherein N is defined as a first natural number, with N, N+1, and N+2 being defined as three sequential natural numbers and the live-view conversion period of N+2th frame data, the live-view reduction period of N+1th frame data, and the live-view display period of Nth frame data are substantially simultaneously performed.

17. The method of claim 16, further comprising:

operating a shutter release button having a two-stage structure to generate a first signal and a second signal.

18. The method of claim 17, wherein when the first signal is generated, performing automatic focusing as the frame data of live-view is continuously processed in the live-view conversion period, the live-view reduction period, and the live-view display period.

19. The method of claim 18, wherein when the second signal is generated, processing of the frame data of live-view is stopped, capturing the photograph-image data while processing of the frame data of live-view is stopped, continuing to process the frame data of live-view when the capture of the photograph-image data is completed, converting the captured photograph-image data to photograph-image data in luminance and chrominance form during each period of time from the time when processing of one frame data of live-view is completed to the time when processing of next frame data begins, reducing resolution of the converted photograph-image data while the frame data of live-view is being processed, compressing the converted photograph-image data while the frame data of live-view is being processed, and recording the compressed photograph-image data and the photograph-image data with reduced resolution in a recording medium while the frame data of live-view is being processed.

20. The method as claimed in claim 12, wherein:

the converting and processing of the photograph-image data is performed to enable the digital image processing apparatus to photograph two photograph images within one second.

21. A digital signal processor, according to claim 1, wherein the photograph-image data is data of a single photograph image, and the data converter processes the single photograph-image data at a plurality of different and non-contiguous times, with a completion of a processing operation of one live-view frame data corresponding to a completion of a processing operation of one live-view frame data.

* * * * *